(12) United States Patent
Preisler

(10) Patent No.: US 6,341,796 B1
(45) Date of Patent: Jan. 29, 2002

(54) AIR BAG COVER WITH A NON-EXPOSED TEAR SEAM

(75) Inventor: Darius J. Preisler, Macobm, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/775,744

(22) Filed: Feb. 2, 2001

(51) Int. Cl.$^7$ ................................................ B60R 21/16
(52) U.S. Cl. ............................... 280/728.3; 280/728.2; 280/730.2
(58) Field of Search .......................... 280/728.1, 728.2, 280/728.3, 730.2, 732

(56) References Cited

U.S. PATENT DOCUMENTS

| | | |
|---|---|---|
| 5,662,351 A | 9/1997 | Phillion et al. |
| 5,738,366 A | 4/1998 | Phillion |
| 5,816,609 A | 10/1998 | Gray et al. |
| 5,897,134 A | 4/1999 | Stein et al. |
| 5,904,367 A * | 5/1999 | Warnez et al. ........... 280/728.3 |

* cited by examiner

*Primary Examiner*—Eric Culbreth
(74) *Attorney, Agent, or Firm*—Brooks & Kushman P.C.

(57) ABSTRACT

An interior trim panel has an air bag cover for supporting an air bag canister and closing an opening in the interior trim panel. The air bag cover is openable when an air bag is deployed from the cannister. The air bag cover has a deployment door panel, an attachment structure and a hinge structure. The deployment door panel has concealable and exposable sides. The attachment structure, which has hinged and bendable bracket portions, is integrally connected to the concealable side of the deployment door. The hinge structure has first and second hinged portions separated and connected by a tear seam. The hinge structure is integrally connected to the concealable side of the deployment door and attached to the interior trim panel. When the air bag deploys, the tear seam separates and the bendable bracket portion bends, thus allowing the air bag to deploy through the opening in the interior trim panel.

10 Claims, 2 Drawing Sheets

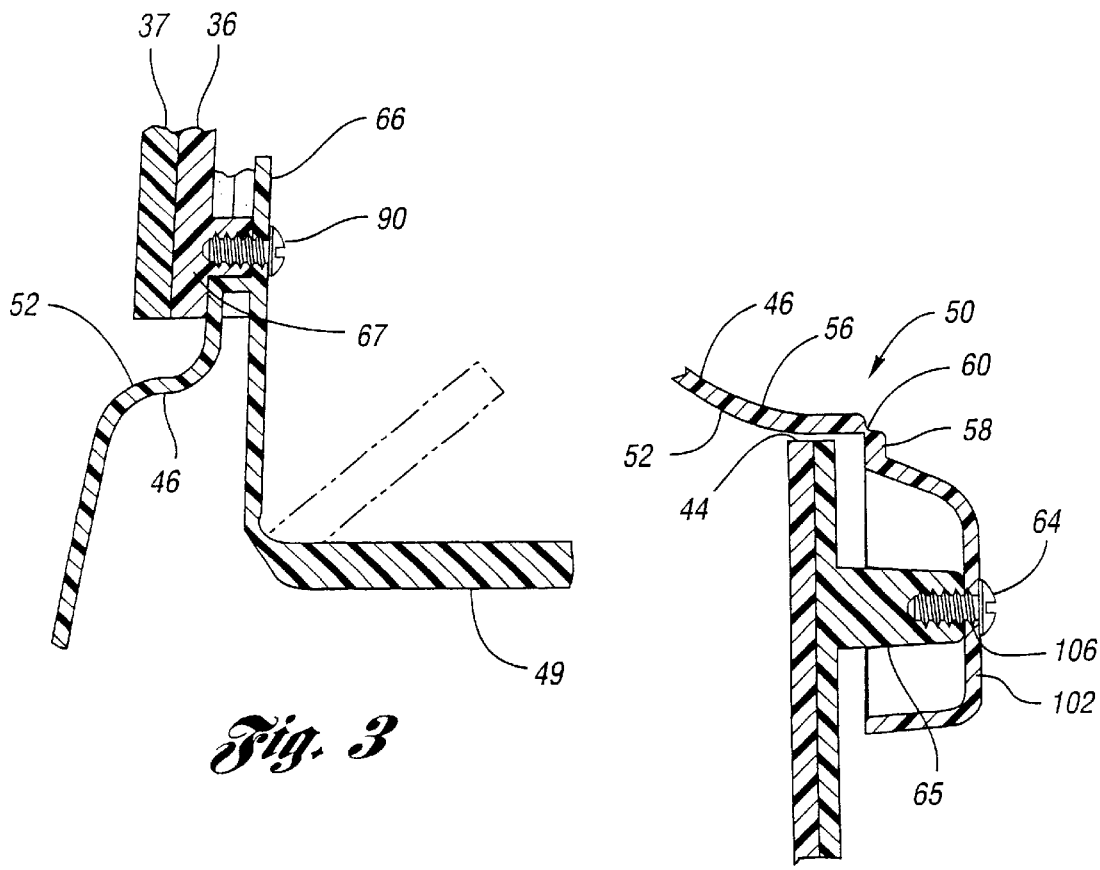
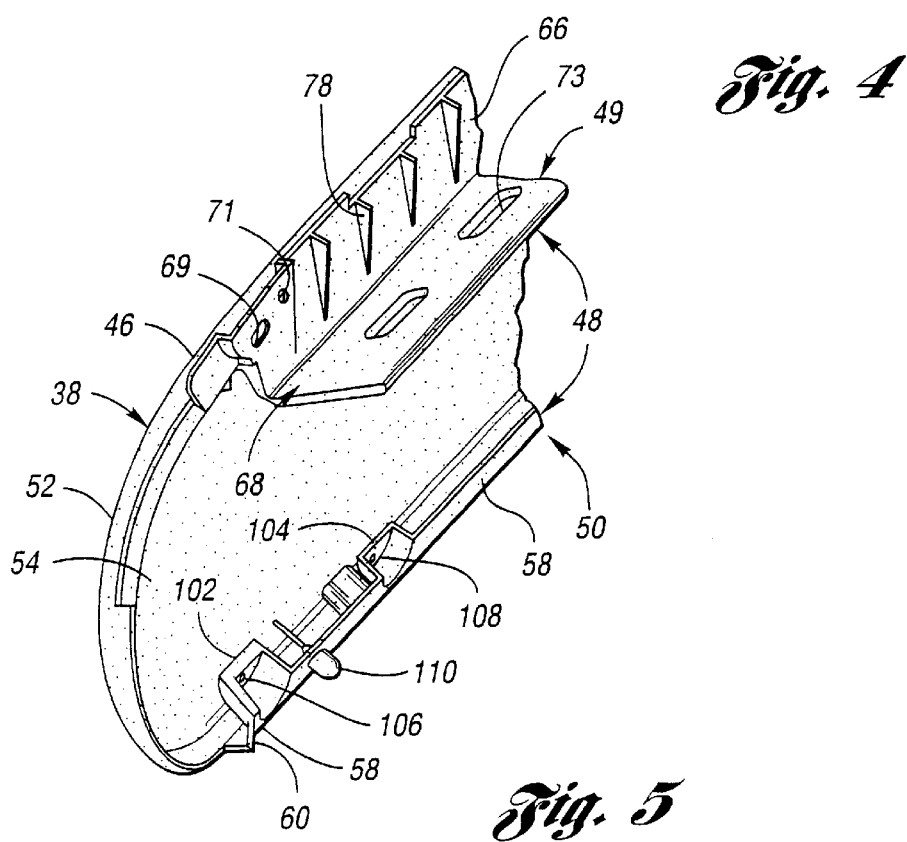

AIR BAG COVER WITH A NON-EXPOSED TEAR SEAM

TECHNICAL FIELD

The present invention relates to an air bag cover which includes a tear seam in a hidden or non-exposed location.

BACKGROUND ART

Overall automobile safety has increased due to the installation of air bag systems in passenger cars. Typically, the air bag system is comprised of an inflator, canister, air bag, and an air bag cover or deployment door. When the inflator is actuated by the impact of an automobile accident, the canister directs the fluid flow from the inflator to the air bag. As the inflator fluid enters the air bag, the air bag extends outward forcing itself towards the deployment door. In turn, the air bag forces the deployment door open and moves the door pivotally away from the emerging air bag which instantly expands into the passenger compartment. The fully inflated air bag cushions the impact felt by an automobile occupant involved in an accident.

The focus of this invention is on the deployment door used on the passenger side of an automobile. Deployment doors have been fastened directly to the reaction canister as part of the air bag system. The deployment door has also been fastened to the vehicle dashboard as well as the air bag canister. Many deployment doors have a tear seam in an exposed or appearance-finish area of the door, sometimes called a class A surface. The tear seams rupture upon the application of force. Once such tear seams rupture, the deployment door moves pivotally away from the emerging air bag. Thus, tear seams used in connection with pivotable deployment doors have been generally known in the prior art.

U.S. Pat. No. 5,897,134 granted to Stein et al. on Apr. 27, 1999 discloses a deployment door which is notched in order to facilitate deployment. The notch is on the inner side surface of the door having class A exterior appearance surface. The notch ruptures upon the influence of an inflating air bag.

U.S. Pat. No. 5,662,351 granted to Phillion et al. on Sep. 2, 1997 discloses a deployment door with an integral flange system. The flange system is comprised of an upper and lower flange which are attached to the air bag system. The lower flange contains a longitudinally grooved portion which is thinner than the rest of the lower flange. When the stress reaches the predetermined elevated level, the grooved portion ruptures fully along it entire length, thus severing its connection with the deployment door. At this point, the deployment door swings open.

U.S. Pat. No. 5,738,366 granted to Phillion on Apr. 14, 1998 discloses a deployment door with a flange projecting from the door. The flange is bolted to a chute structure which is bolted to the air bag system. The chute structure is comprised of a plurality of chute panels and adjacent panels are joined together along fold lines. The force associated with air bag expansion ruptures the fold lines, thus allowing the inflated air bag to push the deployment door open.

U.S. Pat. No. 5,816,609 granted to Gray et al. on Oct. 6, 1998 discloses a deployment door formed with a separate retainer having a frangible hold-down attachment. The deployment door is mounted to the instrument panel by fastening a metal bracket housed on the instrument panel to the underside of the retainer. The frangible attachment holds down the unhinged end of the deployment door and gives way when the air bag is deployed. The frangible attachment includes an extension flap that extends over the retainer. The flap is fastened to the trim panel through bolts that screw into a bracket integrally connected to the trim panel. The bolts pull through the flap with nominal resistance when the air bag is deployed.

While the above mentioned air bag covers work for their intended purposes, they also suffer from certain disadvantages. The typical air bag cover requires the use of class A surfaces. Class A surfaces are readily visible in the vehicle occupant compartment and require expensive material processing or in-mold laminating. The machining of a class A surface is further complicated by adding or juxtaposing a tear seam to the surface. Tear seams which affect class A surfacing further complicate the manufacturing process, which results in increased costs.

Although tear seams exist which do not affect class A surfacing, these tear seams suffer from structural complexity. U.S. Pat. No. 5,662,351 discloses a deployment door with integral flanges. Since the flanges are rigidly positioned, the number of air bag systems which will fit over the flanges is diminished. U.S. Pat. No. 5,738,366 requires the implementation of a chute structure. The cover taught by U.S. Pat. No. 5,816,609 requires the use of a separate retainer. The disadvantage of structural complexity is manifested through expensive manufacturing costs.

There exists a need to construct an air bag cover with a tear seam which does not further complicate the manufacture of class A surfaces. Additionally, the tear seam needs to decrease the structural complexity inherent in the above mentioned air bag cover arrangements.

DISCLOSURE OF INVENTION

An interior trim panel has an air bag cover for supporting an air bag canister and closing an opening in the interior trim panel. The air bag cover is openable when an air bag is deployed from the cannister. The air bag cover has a deployment door panel, an attachment structure and a hinge structure. The deployment door panel has concealable and exposable sides. The attachment structure, which has hinged and bendable bracket portions, is integrally connected to the concealable side of the deployment door. The hinge structure has first and second hinged portions separated and connected by a tear seam. The hinge structure is integrally connected to the concealable side of the deployment door and attached to the interior trim panel. When the air bag deploys, the tear seam separates and the bendable bracket portion bends, thus allowing the air bag to deploy through the opening in the interior trim panel.

Accordingly, an object of the invention is to provide an improved air bag deployment cover that does not require manufacturing a tear seam on an exposed or class A surface. The tear seam is constructed on a hinge structure that is spatially removed from the exposed surface of the deployment cover.

A further object of the invention is to provide an improved air bag deployment cover having a door panel that includes a plastic bracket at one side of the concealable side of the door panel that is adapted for attaching an air bag canister and a plastic hinge at the other side of the concealable side of the door panel that is adapted for attaching the door panel to the interior panel of a vehicle. The bracket is receptive to a broad range of air bag canisters.

Another object of the invention is to provide an improved air bag cover in which manufacture is inexpensive. The construction of the air bag cover does not include machining a tear seam into a class A surface and the cover has an integral bracket on one side to support an air bag canister and an integral hinge on its other side to adapt the cover to the interior panel of a vehicle when the cover is attached to the panel. Therefore, the additional cost of such a process is absent from the manufacture of the disclosed air bag cover.

BRIEF DESCRIPTION OF DRAWINGS

Further features of the present invention will become apparent to those skilled in the art to which the present invention relates from reading the following description with reference to the accompanying drawings, in which:

FIG. 3 is an enlarged fragmentary sectional view showing one means for fastening the top of the air bag deployment cover to the interior trim panel shown in FIG. 2 with the bendable bracket portion for mounting the air bag canister in the pre-mount (phantom) and after-mount (solid) positions;

FIG. 4 is an enlarged fragmentary sectional view showing one means for fastening the bottom of the air bag deployment cover to the interior trim panel shown in FIG. 2; and FIG. 5 is a fragmentary perspective view of the air bag cover from the backside of the air bag cover.

BEST MODE FOR CARRYING OUT THE INVENTION

Figure 1:
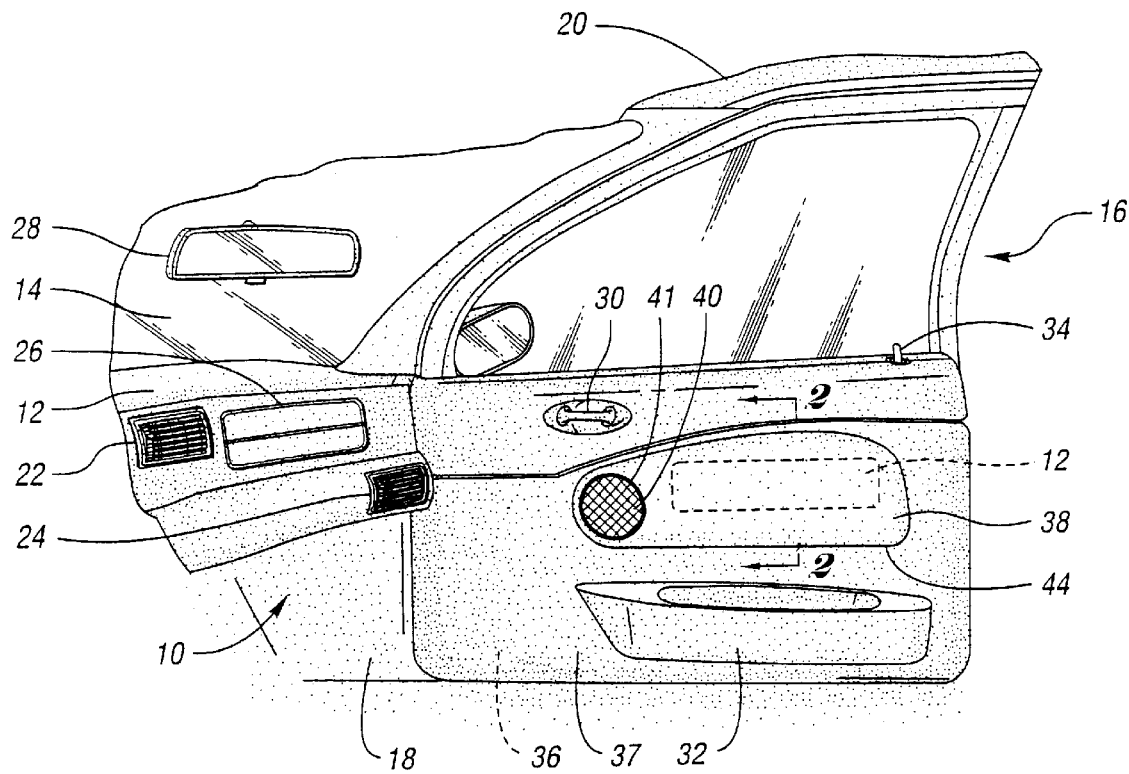
FIG. 1 is a fragmentary perspective view of a portion of a vehicle passenger compartment having an interior side door panel with the improved air bag deployment cover of this invention.

Referring to FIG. 1 of the drawings, a conventional passenger vehicle has an interior passenger compartment 10, that includes a dash board or instrument panel 12 bounded by a windshield 14, a passenger door 16 and side wall 18. The passenger door is bounded by head liner 20 and the side wall 18. Dash board 12 mounts air distribution vents 22, 24, and a glove box 26. The windshield 14 mounts rear view mirror 28. Passenger door 16 has an interior trim panel 36 which may be decoratively covered with fabric or the like 37. Interior trim panel 36 mounts or includes interior door handle 30, storage compartment 32, door lock button 34, and an air bag cover 38 The air bag cover may contain an opening 40 to accommodate a grille 41 as a speaker for a radio.

The attachment structure 112 for attaching the air bag cover to the interior trim panel will be described next following. In general, the attachment structure is integrally connected to the concealable side of the air bag cover 38 so that the exposed appearance finish of the cover will not be marred when a deployment tear seam is formed.

Figure 2:
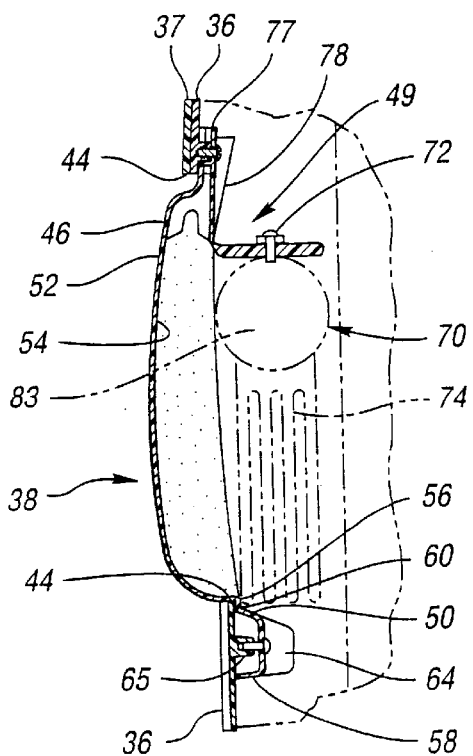
FIG. 2 is a fragmentary sectional view of the deployment cover shown in FIG. 1, taken along the line 2—2 of FIG. 1, showing the air bag canister in a stored and concealed location behind the deployment cover.

In particular and referring to FIGS. 2, 3 and 4, air bag cover 38 completely covers and frames opening 44. Air bag cover 38 comprises deployment door panel 46 having a two-portion attachment structure 48 including a bendable bracket portion 49 and hinged bracket portion 50. The bendable bracket portion as seen in FIGS. 3 and 5 is thicker and stiffer than the hinged bracket portion which may freely pivot due to its bendability from its pre-support position in FIG. 3 (phantom line) to its attachment or support position in FIG. 3 (solid line). Deployment door panel 46 has an exposable or front side 52 and a concealable or back side 54. The exposable side 52 has a finished appearance surface visible from the interior passenger compartment 10. The hinged bracket portion 50 has a first hinge part 56 and a second hinge part 58. The first and second hinge parts are integrally connected by tear seam 60. Tear seam 60 facilitates the opening of deployment door panel 46 along the tear seam when the air bag 74 is deployed. The second hinge part 58 is attachable to the interior trim panel 36 via a fastener such as a screw 64 in a boss 65 on the interior trim panel.

The bendable bracket portion 49 has a fixed bracket portion 66 which mounts to the interior trim panel 36 via fastening holes such as 69, 71, which mounts the fixed bracket portion to the interior trim panel via fastener or screw 90 in a boss 67 on the interior trim panel. The fixed bracket portion 66 has an elongated mounting hole 69 and a circular mounting hole 71 to accommodate the screws 90 and allow for adjustment. The fixed bracket portion may also include stiffening ribs 78. The bendable bracket portion 49 includes holes 73 through which screws or bolts 72 may be used to fasten the air bag canister 70. Air bag canister 70 contains inflator 83 and the collapsible air bag 74. Air bag 74 inflates in response to a vehicle impact and deploys first against the inside 54 of the door panel and then through the opening 44 in the trim panel.

More particularly and referring to FIG. 5, attachment structure 48 has the hinged bracket portion 50 and the bendable bracket portion 49. The bendable bracket portion contains ribs 78, an elongated mounting hole 69 and a circular mounting hole 71. Mounting holes 69 and 71 locate fasteners 90, which are adaptable to fasten the bendable bracket portion to the interior trim panel. Hinge bracket portion 50 has the first hinge part 56, the second hinge part 58 and tear seam 60. The hinge bracket portion 50 has integral mounting housings or bosses 102 and 104, which have mounting holes 106 and 108 to align with bosses 65 on the interior trim panel. A cushion bumper 110 is added as an anti-rattle device and cooperates with the integral boss 65 and interior trim panel in facilitating a cushioned attachment of the door panel to the interior trim panel.

Thus, this invention provides an integrally formed air bag cover that is mountable for pivotal movement about a bendable bracket portion when a two-part hinge bracket portion separates along a tear strip at the hinge axis. One portion of the hinge is also used to attach the air bag cover to the interior trim panel. The air bag cover separates along the tear seam at deployment of the air bag. Subsequently, the deployment door moves out of the way of the deploying air bag as the hinge portions separate.

While an embodiment of the invention have been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. An air bag cover for supporting an air bag canister and for closing an opening in an interior trim panel of a vehicle and which is openable when an air bag is deployed from the canister, the cover comprising:

a deployment door panel having a concealable side having first and second sides, an exposable side, and an attachment structure adapted for attaching the door panel to the interior trim panel and the air bag canister to the door panel;

the attachment structure including a hinge bracket portion at the first side of the concealable side of the door panel for attaching the door panel to the interior trim panel and a bendable bracket portion at the second side of the concealable side of the door panel for supporting the air bag canister, both the hinged and bendable bracket portions being integral with the concealable side of the door panel;

the hinged bracket portion having a first hinge part integrally affixed to the concealable side of the door panel and a second hinge part attachable to the interior trim panel; and the first hinge part being connected to and pivotable with respect to the second hinge part by a tear seam which tears when the air bag starts to deploy and in cooperation with the bending of the bendable bracket portion separates the first hinge part from the second hinge part sufficiently to allow the air bag to deploy through the opening in the interior trim panel when the second hinge part is attached to the interior trim panel.

2. The air bag cover of claim 1 wherein the bendable bracket portion includes stiffening ribs.

3. The air bag cover of claim 1 wherein the bendable bracket portion is thicker than the first and second hinge parts.

4. The air cover of claim 1 wherein the bendable bracket portion has a flexible hinge such that the bendable has a pre-support position before the air bag canister is supported and support position when the air bag canister is supported.

5. The air bag cover of claim 1 wherein the first hinged part is connected to the second hinge part at approximately a 90° angle.

6. The air bag cover of claim 1 wherein the bendable bracket portion contains at least one hole therein to fixedly mount the air bag cover to the interior trim panel.

7. The air bag cover of claim 1 wherein the bendable bracket contains at least one hole therein to fixedly attach the air bag canister.

8. An air bag cover for supporting an air bag canister and for closing an opening in an interior trim panel of a vehicle and which is openable when an air bag is deployed from the canister, the cover comprising:

a deployment door panel having a concealable side having first and second sides, an exposable side, and an attachment structure adapted for attaching the door panel to the interior trim panel and the air bag canister to the door panel;

the attachment structure including a hinge bracket portion at the first side of the concealable side of the door panel for attaching the door panel to the interior trim panel and a bendable bracket portion at the second side of the concealable side of the door panel for supporting the air bag canister, the bendable bracket portion including stiffening ribs configured as attachment bosses, both the hinged and bendable bracket portions being integral with the concealable side of the door panel;

the hinged bracket portion having a first hinge part integrally affixed to the concealable side of the door panel and a second hinge part attachable to the interior trim panel;

the first hinge part being connected to and pivotably with respect to the second hinge part by a tear seam which tears when the air bag starts to deploy and in cooperation with the bending of the bendable bracket portion separates the first hinge part from the second hinge part sufficiently to allow the air bag to deploy through the opening in the interior trim panel when the second hinge part is attached to the interior trim panel.

9. An air bag cover for supporting an air bag canister and for closing an opening in an interior trim panel of a vehicle and which is openable when an air bag is deployed from the canister, the cover comprising:

a deployment door panel having a concealable side having first and second sides, and an exposable side, an opening for a speaker, and an attachment structure adapted for attaching the door panel to the interior trim panel and the air bag canister to the door panel;

the attachment structure including a hinge bracket portion at the first side of the concealable side of the door panel for attaching the door panel to the interior trim panel and a bendable bracket portion at the second side of the concealable side of the door panel for supporting the air bag canister, both the hinged and bendable bracket portions being integral with the concealable side of the door panel;

the hinged bracket portion having a first hinge part integrally affixed to the concealable side of the door panel and a second hinge part attachable to the interior trim panel;

the first hinge part being connected to and pivotable with respect to the second hinge part by a tear seam which tears when the air bag starts to deploy and in cooperation with the bending of the bendable bracket portion separates the first hinge part from the second hinge part sufficiently to allow the air bag to deploy through the opening in the interior trim panel when the second hinge part is attached to the interior trim panel.

10. An air bag cover for supporting an air bag canister and for closing an opening in an interior trim panel of a vehicle and which is openable when an air bag is deployed from the canister, the cover comprising:

a deployment door panel having a concealable side having first and second sides, and an exposable side, and an attachment structure adapted for attaching the door panel to the interior trim panel and the air bag canister to the door panel;

the attachment structure including a hinge bracket portion at the first side of the concealable side of the door panel for attaching the door panel to the interior trim panel and a bendable bracket portion at the second side of the concealable side of the door panel for supporting the air bag canister, both the hinged and bendable bracket portions being integral with the concealable side of the door panel;

the hinged bracket portion having a first hinge part integrally affixed to the concealable side of the door panel and a second hinge part attachable to the interior trim panel;

the first hinge part being connected to and pivotable with respect to the second hinge part by a tear seam which tears when the air bag starts to deploy and in cooperation with the bending of the bendable bracket portion separates the first hinge part from the second hinge part sufficiently to allow the air bag to deploy through the opening in the interior trim panel when the second hinge part is attached to the interior trim panel; and wherein the hinged bracket portion includes a cushion bumper and an integral boss which cooperate in facilitating a cushioned attachment of the door panel to the interior trim panel.

* * * * *

UNITED STATES PATENT AND TRADEMARK OFFICE
CERTIFICATE OF CORRECTION

PATENT NO. : 6,341,796 B1
DATED : January 29, 2002
INVENTOR(S) : Darius J. Preisler It is certified that error appears in the above-identified patent and that said Letters Patent is hereby corrected as shown below:

Column 5,
Line 24, after "air" insert -- bag --.
Line 25, after "bendable" insert -- bracket --.
Line 60, delete "pivotably" and replace with -- pivotable --.

Signed and Sealed this

Eighteenth Day of March, 2003

JAMES E. ROGAN
*Director of the United States Patent and Trademark Office*